US005130904A

United States Patent [19]

Ohshio et al.

[11] Patent Number: 5,130,904

[45] Date of Patent: Jul. 14, 1992

[54] AUTOMOTIVE HEADLAMP WAVING NO ULTRAVIOLET OUTPUT

[75] Inventors: Hirohiko Ohshio; Takashi Hori; Keiichi Inaba, all of Shizuoka, Japan

[73] Assignee: Koito Manufacturing Co., Ltd., Tokyo, Japan

[21] Appl. No.: 674,984

[22] Filed: Mar. 26, 1991

[30] Foreign Application Priority Data

Apr. 20, 1990 [JP] Japan .................................. 2-102892

[51] Int. Cl.$^5$ ................................................ B60Q 1/00

[52] U.S. Cl. ....................................... 362/61; 362/293; 362/297; 362/304

[58] Field of Search ................... 362/61, 293, 80, 296, 362/297, 304, 305, 302, 303, 268

[56] References Cited

U.S. PATENT DOCUMENTS

| | | | |
|---|---|---|---|
| 2,852,980 | 9/1958 | Schroder | 362/293 |
| 3,463,914 | 8/1969 | Lutter | 362/293 |
| 3,473,015 | 10/1969 | Haas et al. | 362/293 |
| 4,506,315 | 3/1985 | Maekawa et al. | 362/297 |
| 4,524,410 | 6/1985 | Kawakatsu et al. | 362/293 |
| 4,754,373 | 6/1988 | Otto et al. | 362/61 |
| 4,845,598 | 7/1989 | Watanabe et al. | 362/61 |

FOREIGN PATENT DOCUMENTS 6480936 3/1989 Japan .

*Primary Examiner*—Allen M. Ostrager
*Assistant Examiner*—Sue Hagarman
*Attorney, Agent, or Firm*—Sughrue, Mion, Zinn Macpeak & Seas

[57] ABSTRACT

An automotive headlamp which cuts off ultraviolet rays generated from a discharge bulb light source, even in the case where the front lens is broken. A reflector is provided having a bulb insertion hole formed in a rear portion thereof, and a socket portion supporting a discharge lamp bulb is attached to the reflector at the bulb insertion hole. A direct-ray shade for shielding direct rays of light is disposed in front of the lamp. An ultraviolet-shielding layer is formed on a front surface of the reflector.

24 Claims, 5 Drawing Sheets

AUTOMOTIVE HEADLAMP WAVING NO ULTRAVIOLET OUTPUT

BACKGROUND OF THE INVENTION

The present invention relates to a car headlamp, and more particularly to a car headlamp in which a discharge-type bulb is employed as a light source.

Recently, discharge-type bulbs having been employed in automotive lamps in view of their good luminous efficiency and desirable color spectrum, as well as their long service life. However, a metal halide bulb, which is a common type of discharge bulb, produces a large quantity of ultraviolet rays together with visual light rays from the discharge which takes place in the gases (mercury gas, iodide gas and xenon gas) contained in the discharge space of the lamp. Ultraviolet rays in a wavelength range of 240–290 nm are believed capable of destroying protein molecules, ultraviolet rays in a wavelength range of 290–320 nm are believed a cause of skin cancer, and ultraviolet rays in a wavelength range of 369–370 nm destroy resin materials. Thus, there has been a problem that the light output of the discharge bulb includes health-damaging ultraviolet rays so that it is undesirable to be subjected to illumination for long periods from such a lamp. Also, resin members in the vicinity of the discharge bulb tend to deteriorate rapidly.

To cut off the emission of ultraviolet rays from a headlamp, it has been proposed to use a front lens made of a glass material which blocks the transmission of ultraviolet rays. If the front lens is broken, however, there is a problem that ultraviolet rays will be emitted.

SUMMARY OF THE INVENTION

The present invention has been attained in view of the above problems in the prior art, and an object thereof is to provide a car headlamp which cuts off ultraviolet rays generated from a discharge bulb light source, even in the case where the front lens is broken.

In satisfaction of the above and objects, the present invention provides an automotive headlamp in which a discharge lamp is supported by a pair of lead supports projecting forward from a socket portion, the discharge bulb is inserted into a bulb insertion hole formed in a reflector and disposed in front of the reflector, a front lens is provided in front of the reflector for distributing light reflected from the reflector, a direct-ray shade for shielding direct rays of light is provided in front of the discharge bulb, and an ultraviolet-ray shielding film is formed on the front surface of the reflector.

The direct-ray shade provided in front of the discharge bulb blocks visible light and ultraviolet rays in the direct path between the discharge lamp and the front lens, and the ultraviolet-ray-shielding film formed on the front surface of the reflector shields ultraviolet rays which are reflected by the reflector toward the front lens to thereby reduce the quantity of the ultraviolet rays passing through the front lens.

DESCRIPTION OF THE PREFERRED EMBODIMENTS

Figure 1:
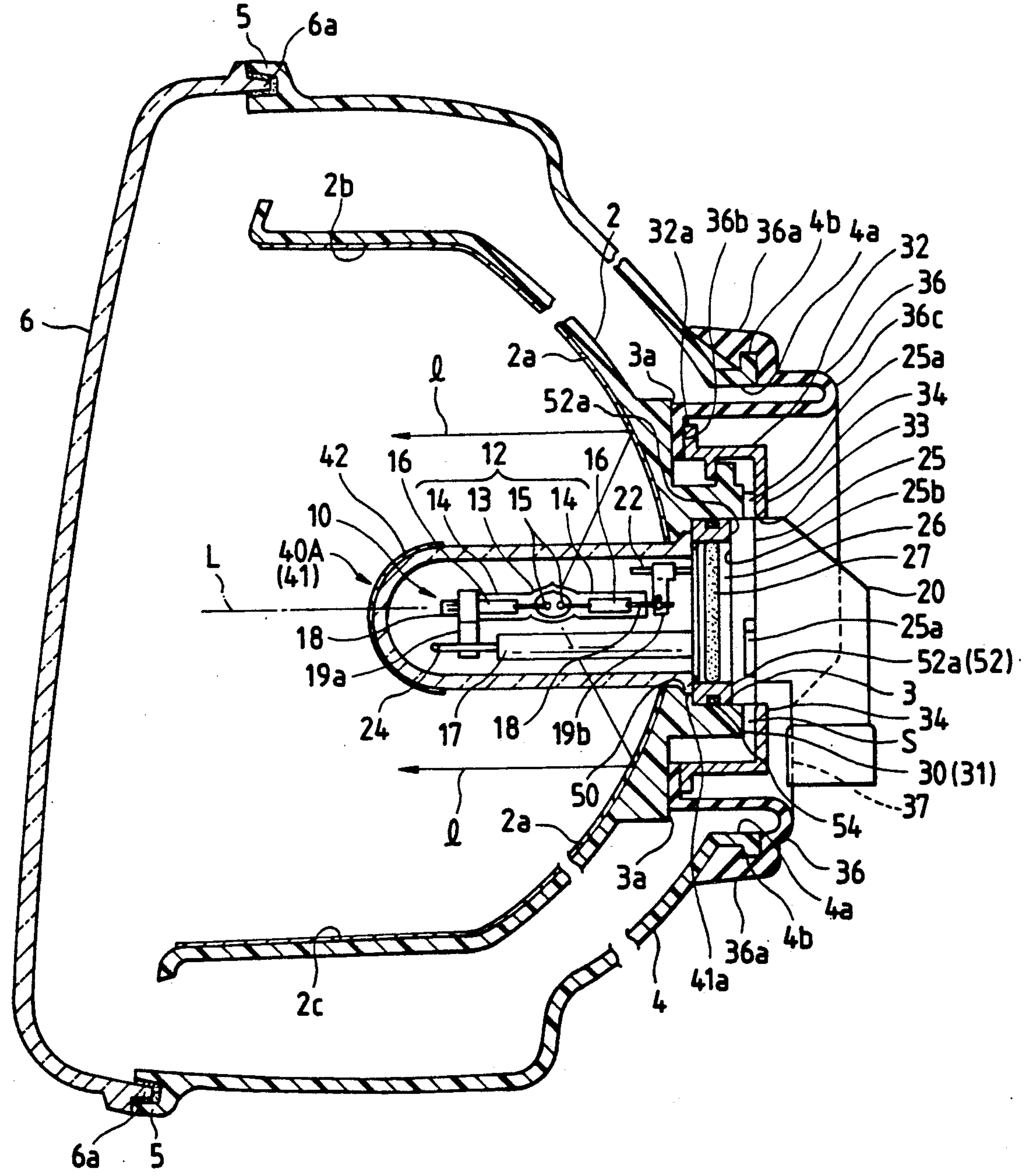
FIG. 1 is a vertical sectional view of a movable-reflector type automotive headlamp constructed according to a first embodiment of the present invention.

Referring to the drawings, preferred embodiments of the present invention will be described hereunder.

Figure 2:
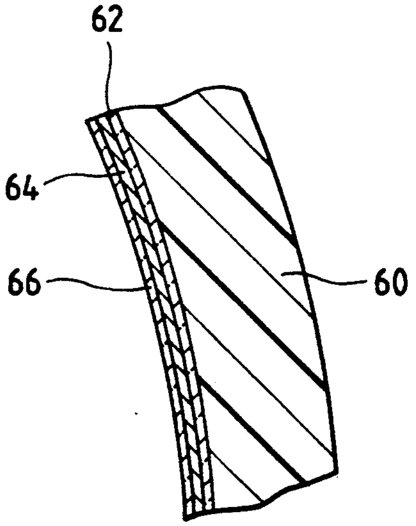
FIG. 2 is an enlarged sectional view of a portion of the reflector of the headlamp of FIG. 1.

FIGS. 1 and 2 show an embodiment in which the present invention is applied to a movable-reflector type headlamp in which a reflector is supported within a lamp body in such a manner as to be tiltable. FIG. 1 is a vertical sectional view of the headlamp taken through a discharge bulb insertion portion, and FIG. 2 is an enlarged sectional view of a reflector and is used for explaining the structure of the light reflecting surface of the reflector.

In the drawing, reference numeral 2 designates a reflector provided in a lamp body 4. A discharge bulb 10 is mounted in the reflector 2 at its rear top portion, and a front lens 6 is attached to a front opening portion of the lamp body 4 so as to be integrated as a headlamp. The reflector 2 is constituted by a main parabolic surface 2*a* and sub-reflecting surfaces 2*b* and 2*c*, which extend horizontally above and under the main reflecting surface 2*a*. The light emitted from the discharge bulb 10 is mainly reflected by the main reflecting surface 2*a* of the reflector and directed to the front lens 6 as parallel rays of light (indicated by symbol l in FIG. 1). A preferred light distribution pattern is obtained through the provision of light-distribution steps (not shown) formed on the front lens 6.

The reflector 2 is supported by an aiming mechanism (not shown) constituted by two aiming screw (an upward/downward aiming screw and a leftward/rightward aiming screw) supported by the back wall of the lamp body 4 and extending forward and rearward, and a swinging fulcrum projecting forward from the rear wall of the lamp body and having a ball joint structure. By rotating the upward/downward (leftward/right) aiming screws, the tilt angle of the reflector 2 can be adjusted, that is, the direction of the illumination axis L of the headlamp (the illumination angle of the headlamp) can be adjusted in the up/down and left/right directions.

A bulb insertion hole 3 is formed in the rear top portion of the reflector 2, and the discharge bulb 10 and a direct-ray shade 40A completely covering the discharge bulb 10 are inserted into the bulb insertion hole 3.

The discharge bulb 10 is primarily composed of a discharge lamp 12, which is the light-emitting portion, and lead supports 22 and 24 projecting from an L-shaped socket 20 so as to support the discharge lamp 12.

The discharge lamp 12 has a structure in which opposite end portions of a quartz glass tube are pinched so that pinch seal portions 14 are formed at opposite end portions of a closed glass bulb 13 of an oval shape forming a discharge space. A startinq rare gas, mercury and a metal halide are enclosed in the glass bulb 13. Discharge electrodes 15 made of tungsten are provided in opposition to each other in the discharge space. The discharge electrodes 15 are connected to respective molybdenum foils 16 sealed in the pinch portions 14. Lead wires 18 connected to the molybdenum foils 16 are led out from the end portions of the pinch portions 14. The lead wires 18 are supported, through metal supports 19*a* and 19*b*, by a pair of long and short lead supports 22 and 24, which are molded in an insulating base in the socket portion and which project forward from the base. The discharge lamp 12 is supported at its opposite ends by the lead supports 22 and 24 through the lead wires 18. Reference numeral 17 designates a cylindrical discharge-preventing ceramic insulating body fitted over the lead support 24.

Reference numeral 25 designates a focus ring integrally formed with the socket 20. Three projecting claws 25*a* are provided on the outer circumference of the focus ring 25. A sealing O-ring 27 is placed around the outer circumference of a base port 26 of the socket 20 so as to assure a tight seal at the portion where the socket base portion 26 is engaged with the bulb insertion hole 3. Reference numeral 30 designates a cylindrical rearward projecting portion of the reflector 2 forming the bulb insertion hole 3. The rearward projecting portion 30 is positioned inside an opening portion 4*a*, which has a circumference larger than that of the bulb insertion hole 3 formed in the lamp body 4 and through which the bulb assembly is removably attached. A hat-shaped socket fixture 32 for fixing the discharge bulb 10 is attached to the rearward projecting portion 30 through bayonet engagement. An opening portion 33 having a shape engageable with the claws 25*a* of the focus ring 25 of the discharge bulb 10 is formed in the socket fixture 32. When the claws 25*a* on the bulb side are held in the gap S between a circumferential edge portion 34 of the opening portion 33 and a top end surface 31 of the reflector-side projecting portion 30, the discharge bulb 10 is fixedly held in the bulb insertion hole 3. Further, a rubber cover 36 is interposed between a circumferential edge portion 4*b* of the lamp-body-side opening portion and a planar rim 3*a* of the base portion of the reflector-side projecting portion. An outer circumferential edge portion 36*a* of the rubber cover is elastically fitted to the circumferential edge portion 46 of the lamp-body-side opening portion, while an inner circumferential edge portion 36*b* of the rubber cover is pressingly held in the reflector-side planar rim 3*a* by an outer flange 32 of the socket fixture 32. With this structure, water or dust is prevented from passing through the lamp-body-side opening portion 4*a* and entering the lamp body.

Further, a middle-portion range 36*c* between the outer circumferential edge portion 36*a* and the inner circumferential edge portion 36*b* of the rubber cover 36 is made thin, and a rearward-projecting bent portion is formed on the thin middle-portion 36*c* so as to be able to follow the tilting movement of the reflector 2. Reference numeral 37 designates a concave-portion range formed on the middle portion 36*c* of the rubber cover so that the rubber cover 36 does not interfere with the socket 20 when the discharge bulb is replaced. The detailed structure of the socket fixture 32 and the reflector-side rearward projecting portion 30 is disclosed in Japanese Utility Model Application No. Hei-1-110324.

The direct-ray shade 40A includes a light-shielding coating portion 42, namely, a black coating, formed on a top-end outer-circumferential portion of a transparent glass globe 41 of the lamp which has a closed spherical end portion. The rear end portion of the globe is fixedly held in the bulb insertion hole 3, and the portion of the discharge bulb 10 which projects forward from the reflector 2 is completely covered by the globe 41. The extent of the light-shielding coating 42 on the globe 41 corresponds to the shape of the parabolic light reflecting surface of the reflector, that is, the light-shielding coating 42 has an extent such that light passing directly to the reflector 2 from the discharge lamp 12 is not cut off, but light which would otherwise pass directly to the front lens 6 can be sufficiently cut off. Accordingly, of the visible light and ultraviolet rays emitted by the discharge lamp 12, light which would otherwise pass directly from the discharge lamp 12 to the front lens 6 is shielded by the light-shielding coating 42 to thereby prevent the outgoing light and ultraviolet rays from dazzling drivers of oncoming vehicles.

A circumferential flange 41*a* is provided on the open end (rear) portion of the globe 41. The flange 41*a* is engaged with a circumferential globe insertion groove 50 provided on the front surface side of the bulb insertion hole 3 of the reflector, so that the direct-ray shade 40A (the globe 41) is projectingly provided in front of the reflector 2. A globe fixing ring 52 is inserted into the bulb insertion hole 3 so that the socket base portion 26 is engaged with the globe fixing ring 52 to thereby insert the discharge bulb 10. When the discharge bulb 10 is fixedly held in the bulb insertion hole 3 through the socket fixture 32 as described above, a front surface 25*b* of the focus ring 25 presses a rear end surface 52*a* of the globe fixing ring, and the fixing ring 52 presses the globe flange 41*a* into the globe insertion groove 50, so that the discharge bulb 10 is fixed and simultaneously the direct-ray shade 40A (the globe 41) is also fixed. Reference numeral 54 designates a sealing O-ring interposed between the globe fixing ring 52 and the inner-circumferential surface of the bulb insertion hole.

Thus, in this embodiment, the globe insertion groove 50, which is a convexo-concave engagement portion for fixing the direct-ray shade 40A (the globe 41), is formed in the bulb insertion hole 3 so that the flange 41*a* is engaged with the groove 50 to thereby fix the globe 41.

Figure 3:
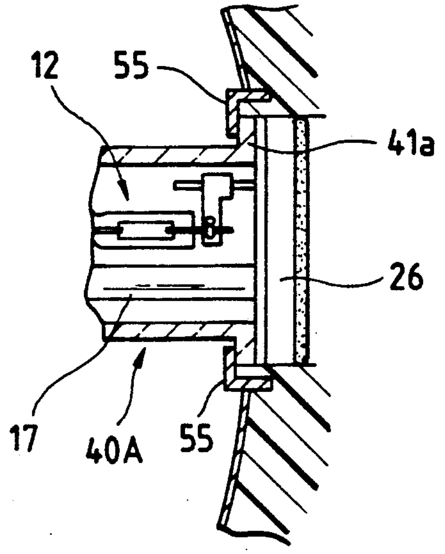
FIG. 3 is a explanatory view for explaining the characteristics of a globe-attaching portion of the headlamp of FIG. 1.

Generally, in order to fix a globe to a reflector, it has been the practice to provide metal fittings 55 for fixedly holding the flange 41*a* of the globe on the front surface of the reflector in cooperation with the socket base portion 26, as shown in FIG. 3. If such metal fittings are provided, however, there is a problem that the effective reflecting area of the reflector is reduced by a portion corresponding to the globe fixing structure provided on the reflecting surface of the reflector. However, the above embodiment has the advantage that the globe fixing means, constituted by the flange 41*a* on the globe side and the groove 50 on the reflector side, is disposed in the bulb insertion hole 3, so that the effective reflecting area of the reflector side is not reduced.

Further, an ultraviolet-ray shielding film is formed on the surface of the reflector. That is, as shown in FIG. 3, the light-reflecting surface of the reflector 2 has a structure in which an undercoat layer 62 is formed on the surface of a parent material 60 of the reflector, an aluminum layer 64 is deposited on the undercoat layer 62, and a topcoat layer 66 of an ultraviolet-absorbing film is formed on the aluminum layer 64. The undercoat layer 62 is a coating layer for smoothing the surface of the parent material 60 and for increasing the adhering strength between the aluminum layer 64 and the parent material 60. The structure of the lamination constituted by the undercoat layer 62, the aluminum layer 64 (which defines a light-reflecting member formed on the undercoat layer 62), and the topcoat layer 66 formed on the aluminum layer 64 for protecting the aluminum layer 64 is the same as the structure of the light-reflecting surface of a conventional reflector. However, in this embodiment ZnO is dispersed in the topcoat layer 66, so that the topcoat layer has the property of absorbing the ultraviolet rays generated together with visible light by the discharge bulb 12 while transmitting only visual light. Accordingly, all light passing to the reflector 2 from the discharge lamp 12 is subjected to an ultraviolet-ray absorbing action by the topcoat layer 66 twice, that is, before and after the light is reflected from the surface of the aluminum layer 64, whereby all light which is reflected by the reflector 2 to the front lens 6 is visible light from which ultraviolet rays have been eliminated.

In order to form the topcoat layer 66 of the ultraviolet ray shielding film, fine particles of ZnO are dispersed in a topcoat layer forming material (concentration of 20–30%), and the ZnO-dispersed material is applied using a suitable method such as dipping, spray, deposition, or the like. In order to make the transmission factor of ultraviolet rays in a wavelength range shorter than 370 nm zero, it is necessary to make the thickness of the film not less than 1.6 μm, and it is desirable for the thickness of the film to be not thicker than 5 μm in order to prevent peeling. Further, the wavelength range of ultraviolet rays which can be cut off changes depending on the temperature of the layer (the cut-off wavelength range being shifted towards longer wavelengths as the temperature increases). Thus, the film suitably should have a thickness such that at least ultraviolet rays in a wavelength range not longer than 370–380 μm can be cut off. The film thickness can be adjusted, for example, by changing the dipping rate or by changing the number of times of coating application or the number of times of deposition.

Although the ultraviolet-ray shielding film preferably has ZnO dispersed in the topcoat layer on the light reflecting surface of the reflector, the topcoat layer may have dispersed therein another compound capable of absorbing ultraviolet rays, for instance, $TiO_2$:, CaO, $Fe_2O_3$, or the like. However, ZnO is preferred.

Figure 4:
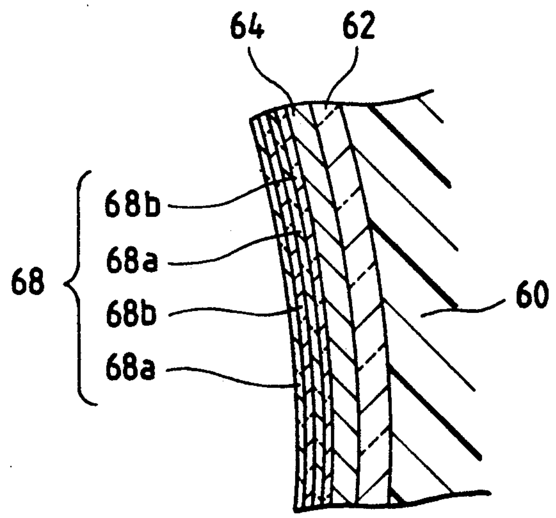
FIG. 4 is an enlarged sectional view of a reflector which is a main portion of another embodiment of the present invention.

FIG. 4 shows a main portion of a second embodiment of the present invention, and is an enlarged sectional view of a light reflecting surface of a reflector (a view corresponding to FIG. 3).

In the drawing, reference numeral 68 designates a topcoat layer having an ultraviolet-ray shielding function which is formed on an aluminum layer 64. The topcoat layer 68 is constituted by a dielectric multi-layer film made of ultraviolet-absorbing compounds such as $TiO_2$, $SiO_2$, MgF, and $Ta_2O_5$ which differ from one another in refractive index.

In FIG. 4, the topcoat layer 68, which is the ultraviolet-ray shielding film, is constituted by a dielectric multi-layer film in which $SiO_2$ layers 68*a* and $TiO_2$ layers 68*b* are alternately laminated one on one. Ultraviolet rays in a wavelength range not longer than 360 nm are absorbed by the $SiO_2$ layers and the $TiO_2$ layers. Ultraviolet rays in a wavelength range from 360 nm to 380 nm are canceled out by rays reflected at the boundary surfaces between the dielectric layers.

Further, the multi-layer film may have a structure in which $Ta_2O_5$ layers are used in place of the $TiO_2$ layers, that is, in which the $Ta_2O_5$ layers and the $SiO_2$ layers are alternately laminated one on one. In such a case, the ultraviolet rays in a wavelength range not longer than 300 nm are absorbed by the respective dielectric layers, and the ultraviolet rays in the wavelength range from 300 nm to 380 nm are canceled by range reflected at the boundary surfaces between the respective dielectric layers. Alternatively, the multi-layer film may have a structure in which $TiO_2$ layers and MgF layers are alternately laminated one on one. That is, a film thickness d of each of the dielectric layers (for example, 68*a*, 68*b*) is set to $d=(n/4)\lambda$ (where λ is the wavelength to be canceled and n is the refractive index of the dielectric). If the film thickness d is selected to be a suitable value, the phase of the light rays reflected at the boundary surfaces between the respective dielectric layers is inverted relative to the phase of the incident light, and the reflected light acts to cancel the ultraviolet rays having the wavelength λ.

Figure 5:
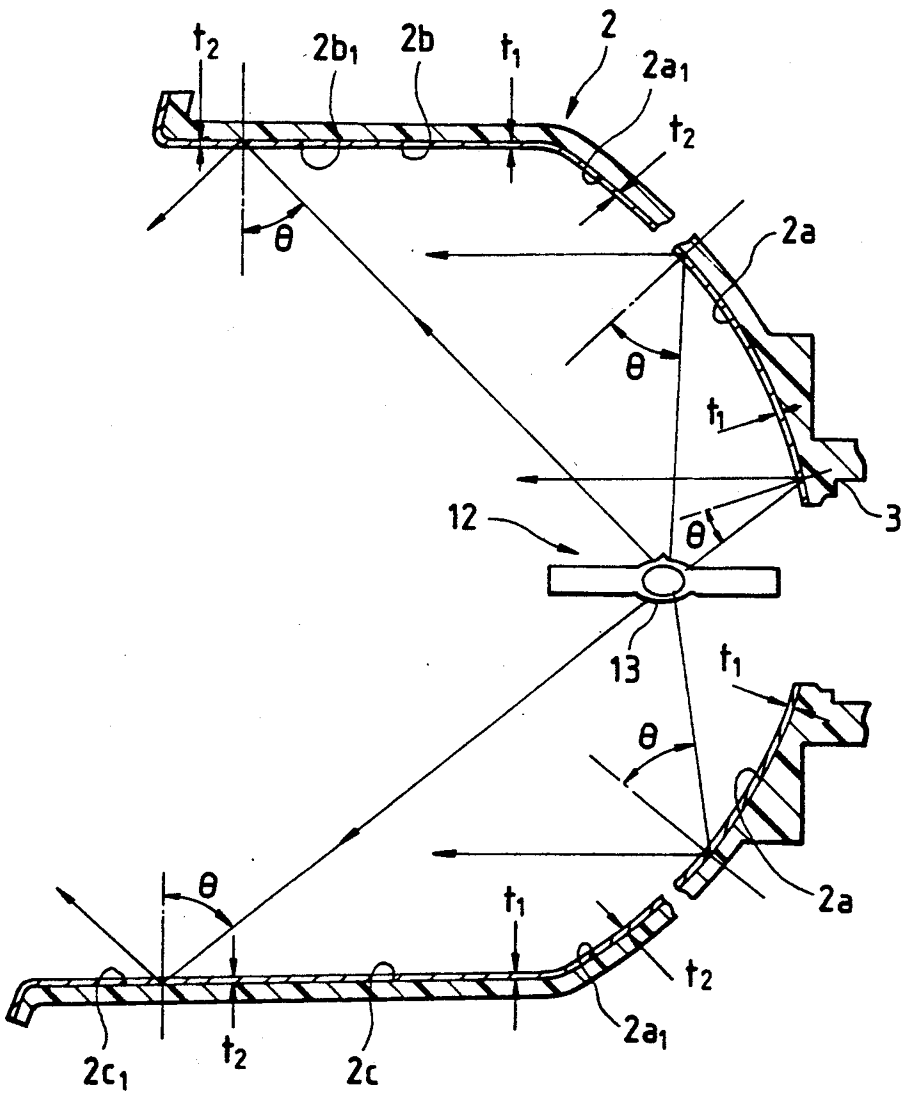
FIGS. 5 and 6 are sectional views for explaining changes in the thickness of a top coat layer of an ultraviolet shielding film.
Figure 6:
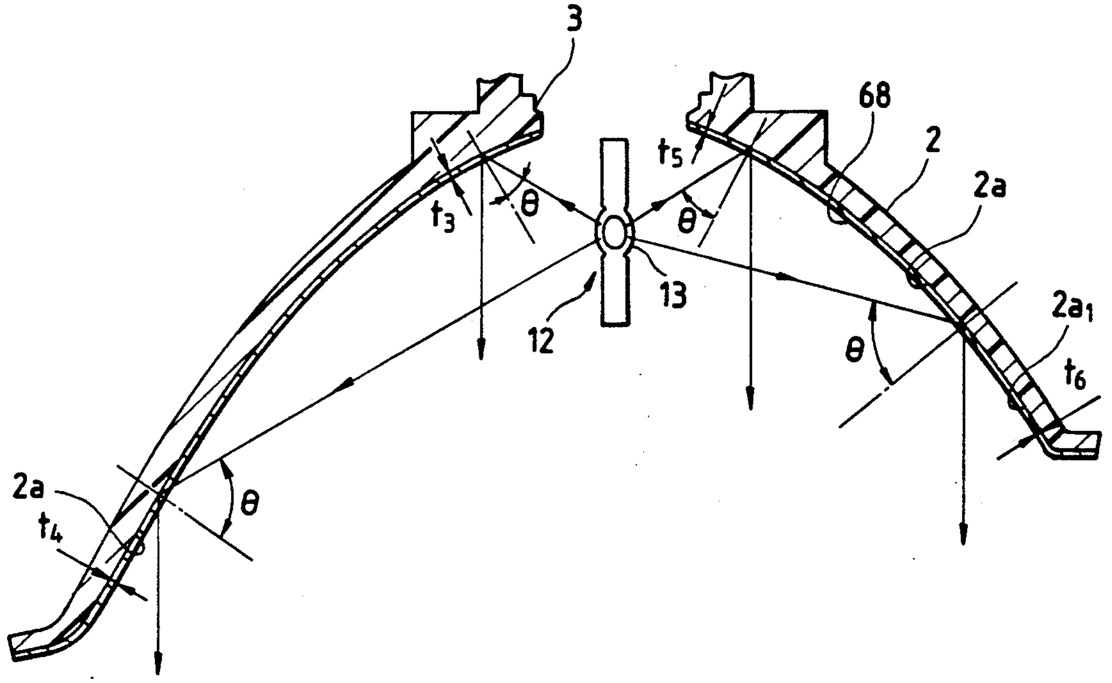

Further, the thickness of the dielectric layer is preferably increased as the distance between the discharge lamp 12 and the dielectric layer increases, thereby to prevent the wavelength range of the ultraviolet rays to be cut off from changing. That is, the wavelength range of the ultraviolet rays cut-off in the topcoat layer 68 is shifted to the shorter wavelength side in proportion to the incident angle of the light into the topcoat layer 68. Accordingly, if the film thickness t of the topcoat layer 68 (the thickness of the dielectric multi-layer film) on the light reflecting surface were constant, there would be a problem that the ultraviolet-ray cutting function would be poor in positions relatively far from the bulb insertion hole 3. More specifically, if the topcoat layer 68 were constant in thickness over all the light reflecting surface, the incident angle θ of the light would be large in a circumferential edge portion range $2a_1$ of the main reflecting surface 2*a* and front-surface opening-edge-side ranges $2b_1$ and $2c_1$ of the up and down sub-reflecting surfaces 2*b* and 2*c*, so that the ultraviolet-ray cutting function is inferior (the cut-off ultraviolet-ray wavelength range is shifted toward the short wavelength side). However, as shown in FIGS. 5 and 6, by adjusting the thickness of the respective dielectric layers 68*a* and 68*b* in proportion to the light incident angles $\theta(t_1<t_2, t_3<t_4, t_5<t_6)$, the cut-off ultraviolet-ray wavelength ranges are made substantially uniform over all the light reflecting surface of the reflector.

Figure 7:
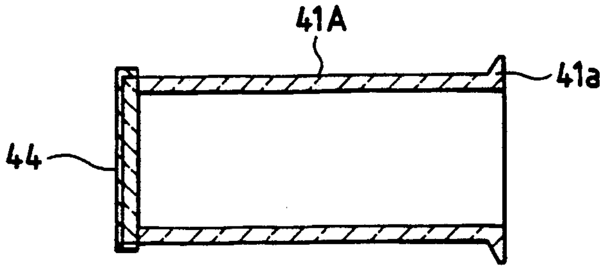
FIG. 7 is a vertical sectional view of another embodiment of a direct-ray shade.

Further, as shown in FIG. 7, the globe may have a structure in which a shade member 44 for shielding direct rays of light is integrally attached to a transparent cylindrical globe 41 at its front-end side opening portion.

In the above embodiments, although only the topcoat layer constituting the light reflecting surface of the reflector has an ultraviolet-ray cut-off function, the glass of the globe 41/41A itself has no ultraviolet-ray blocking function. However, the globe 41/41A may be made of a glass material having an ultraviolet absorbing function, such as soda glass, hard glass, alumina silicate glass, or the like, or the inside and/or outside of the globe 41/41A may be coated with an ultraviolet absorbing film made of ZnO or the like, or a dielectric multi-layer film having an ultraviolet cut-off function, whereby ultraviolet rays are cut off by both the globe and the reflector.

Although in the above-embodiments the direct-ray shade is formed on the forward end of the transparent globe, a metal shade may be directly fixed to the reflector.

Figure 8:
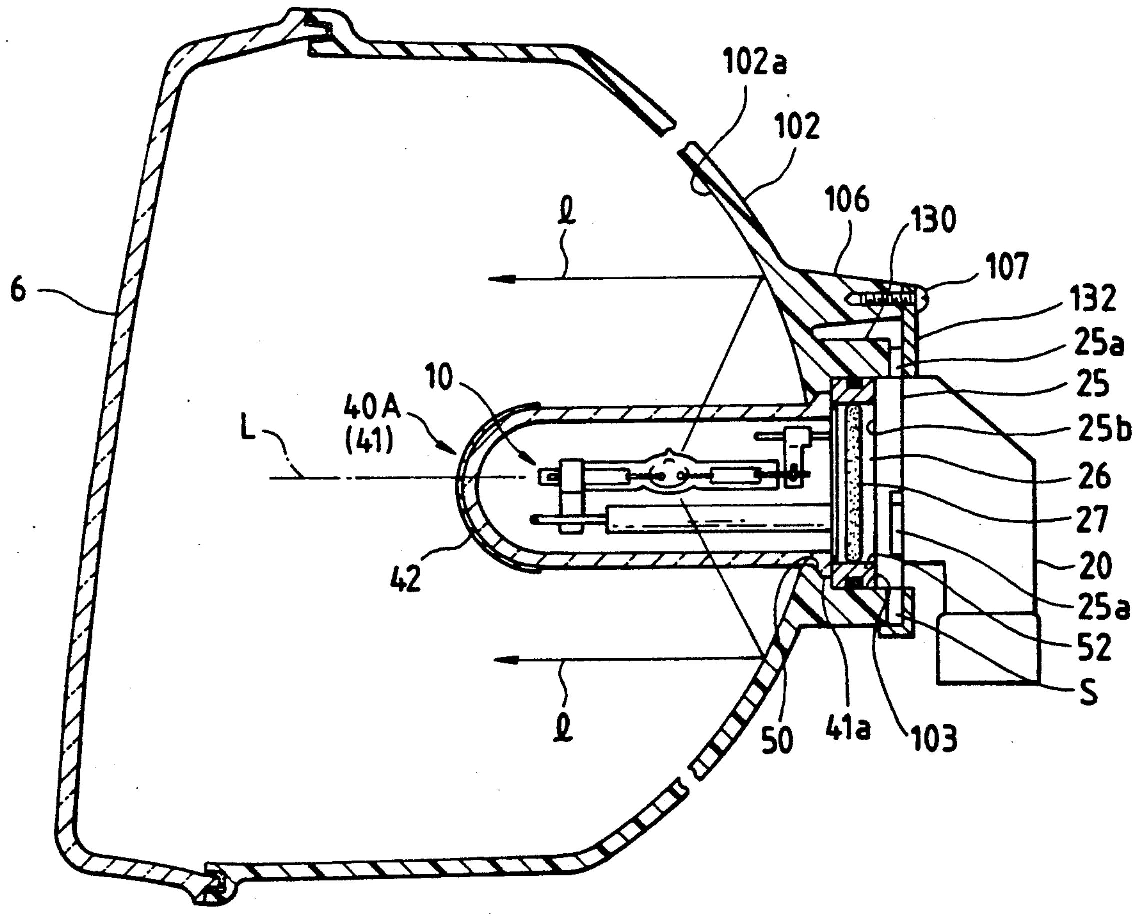
FIG. 8 is a vertical sectional view of an embodiment in which the present invention is applied to a movable-unit type headlamp.

FIG. 8 shows another embodiment in which the present invention is applied to a movable-unit type headlamp. The drawing is a vertical sectional view of the headlamp taken through a discharge bulb insertion portion.

In the drawing, reference numeral 102 designates a lamp body reflector unit (hereinafter referred to as lamp body unit) in which a light reflecting surface 102*a* constituting a reflector on an inner circumferential surface of a lamp body is integrally formed. The structure of the light reflecting surface 102*a* is similar to that of the light reflecting surface of the movable-reflector type headlamp (see FIG. 3 or FIG. 4) as described above, and hence a further description will be omitted.

The lamp body unit 102 is supported, by means of an aiming mechanism (not shown), on a lamp housing (not shown) provided at the rear side of the lamp body unit. The lamp body unit 102 can be tilted by the aiming mechanism relative to the lamp housing to thereby adjust the tilt angle of the lamp body unit 102, that is, the direction of the illumination axis L of the headlamp (the illumination angle of the headlamp) can be adjusted in the up/down and left/right directions. A bulb insertion hole 103 is formed in the rear top portion of the lamp body unit 102, and a direct-ray shade 40A and a discharge bulb 10 are inserted into the bulb insertion hole 103.

Reference numeral 132 designates a socket fixture for fixing the discharge bulb 10. A plurality of bosses 106 project from the circumference of a cylindrical rearward-projecting portion 130 forming the bulb insertion hole 103. The socket fixture 132 is fixedly attached to the bosses 106 by screws 107. The detailed structure of the socket fixture 132 is disclosed, for example, in U.S. Pat. No. 4,760,506. The other elements are the same as described above, and are identified by like reference numerals. Accordingly, a further detailed description those elements will be omitted.

As is apparent from the above description, in the automotive headlamp according to the present invention, the direct-ray shade provided in front of the discharge lamp shields both visible light and ultraviolet rays which would otherwise pass directly to the front lens from the discharge lamp, and the ultraviolet-ray shielding film shields out the ultraviolet rays which would otherwise be reflected by the reflector toward the front lens. Thus, the quantity of ultraviolet rays emitted through the front lens is reduced. Accordingly, there are no health problems associated with the use of the inventive headlamp. Further, since ultraviolet rays are not included in the light reaching the front lens, the front lens can be made of a synthetic resin. Moreover, the headlamp can be used without fear of health problems, even in the case where the front lens is damaged.

What is claimed is:

1. An automotive headlamp comprising: a reflector having a bulb insertion hole formed in a rear portion thereof; a socket portion attached to said reflector at said bulb insertion hole, said socket portion having pair of lead supports projecting therefrom; a discharge lamp bulb supported by said pair of lead supports within said reflector; a front lens disposed in front of said reflector; a direct-ray shade for shielding direct rays of light disposed in front of said lamp; and an ultraviolet-shielding layer formed on a surface of said reflector.

2. The automotive headlamp of claim 1, wherein said reflector has a main parabolic surface and a pair of sub-reflecting surfaces extending horizontally above and below said main reflecting surface.

3. The automotive headlamp of claim 1, wherein said front lens has light-distributing steps formed thereon.

4. The automotive headlamp of claim 1, further comprising a transparent glass globe disposed around said discharge lamp bulb, said direct-ray shade being formed on an end portion of said globe.

5. The automotive headlamp of claim 4, wherein said globe has a flange portion formed at a rear end thereof, said flange portion being received in a circumferential groove formed in said bulb insertion hole.

6. The automotive headlamp of claim 5, further comprising a globe fixing ring disposed in said bulb insertion hole in abutment with said flange portion of said globe, a socket base portion of said socket portion abutting against said globe fixing ring.

7. The automotive headlamp of claim 6, further comprising a socket fixture fixed to a rear end of said reflector for retaining said socket portion against a rear end of said bulb insertion hole of said reflector.

8. The automotive headlamp of claim 2, further comprising a transparent glass globe disposed around said discharge lamp bulb, said direct-ray shade being formed on an end portion of said globe, said direct-ray shade having an extent corresponding to said main parabolic surface of said reflector.

9. The automotive headlamp of claim 4, wherein said globe is made of an ultraviolet blocking glass.

10. The automotive headlamp of claim 9, wherein said ultraviolet blocking glass is selected from the group consisting of soda glass, hard glass, and alumina silicate glass.

11. The automotive headlamp of claim 4, further comprising an ultraviolet blocking coating formed on said globe.

12. The automotive headlamp of claim 1, wherein said ultraviolet-shielding film comprises an undercoat layer formed on a surface of said reflector, an aluminum layer deposited on said undercoat layer, and a topcoat layer of an ultraviolet-shielding film formed on said aluminum layer.

13. The automotive headlamp of claim 12, wherein ZnO is dispersed in said topcoat layer.

14. The automotive headlamp of claim 12, wherein ZnO is present in said topcoat layer in a concentration in a range of 20 to 30%.

15. The automotive headlamp of claim 12, wherein a thickness of said ultraviolet-shieldinq film is not less than 1.6 μm.

16. The automotive headlamp of claim 12 wherein a material selected from the group consisting of $TiO_2$, CaO and $Fe_2O3$ is dispersed in said topcoat layer.

17. The automotive headlamp of claim 1, wherein said ultraviolet-shielding film comprises a multilayer dielectric film, layers of said dielectric film differing from one another in refractive index.

18. The automotive headlamp of claim 17, wherein said dielectric film comprises a plurality of layers of $SiO_2$ and $TiO_2$ laminated alternatingly with one another.

19. The automotive headlamp of claim 17, wherein said dielectric film comprises a plurality of layers of $SiO_2$ and $TaO_5$ laminated alternating with one another.

20. The automotive headlamp of claim 17, wherein said dielectric film comprises a plurality of layers of $TiO_2$ and MgF laminated alternating with one another.

21. The automotive headlamp of claim 17, wherein a film thickness d of each of said dielectric layers is set to $d=(n/4)\lambda$, where $\lambda$ is the wavelength to be canceled and n is the refractive index of the dielectric layer.

22. The automotive headlamp of claim 17, wherein a thickness of said dielectric film increases in accordance with a distance from said discharge lamp.

23. The automotive headlamp of claim 1, further comprising a headlamp body, said reflector being received in said headlamp body and said lens being fixed to a front opening of said headlamp body, and aiming means for tiltably mounting said reflector in said headlamp body.

24. The automotive headlamp of claim 1, wherein said lens is fixed to a front opening of said reflector.

* * * * *